United States Patent

Schulz et al.

[11] Patent Number: 6,066,369
[45] Date of Patent: May 23, 2000

[54] METHOD OF AND APPARATUS FOR PRODUCING A COMPOSITE WEB

[75] Inventors: Herbert Schulz, Troisdorf; Dieter Ott, Sankt Augustin; Michael Deuerling, Weilerswist, all of Germany

[73] Assignee: Reifenhauser GmbH & Co. Maschinenfabrik, Troisdorf, Germany

[21] Appl. No.: 09/227,766

[22] Filed: Jan. 8, 1999

[30] Foreign Application Priority Data

Jan. 27, 1998 [EP] European Pat. Off. .............. 98101353

[51] Int. Cl.[7] .............................. B05D 1/26; B05C 3/12; B05C 5/02
[52] U.S. Cl. .......................... 427/458; 427/472; 427/420; 427/316; 427/176; 427/172; 118/33; 118/407; 118/419; 118/638
[58] Field of Search ..................................... 427/172, 173, 427/176, 420, 458, 472, 316; 118/33, 419, 624, DIG. 4, 638, 407

[56] References Cited

U.S. PATENT DOCUMENTS 762,357  6/1904  Smith .
2,349,710  5/1944  Evans .
4,052,521  10/1977  Ferrari .

FOREIGN PATENT DOCUMENTS

| 2 185 928 | 3/1997 | Canada . |
| 38 22 297 | 1/1990 | Germany . |
| 195 34 702 | 3/1997 | Germany . |
| 2-276636 | 11/1990 | Japan . |
| 9-187897 | 7/1997 | Japan . |
| 2 290 052 | 12/1995 | United Kingdom . |
| WO 97 29909 | 8/1997 | WIPO . |

OTHER PUBLICATIONS

Patent Abstracts of Japan, vol. 097, No. 011, Nov. 28, 1997.
Patent Abstracts of Japan, vol. 015, No. 011, (M–1075), Jan. 30, 1991.

*Primary Examiner*—Fred J. Parker
*Attorney, Agent, or Firm*—Herbert Dubno

[57] ABSTRACT

Thin thermoplastic foil is applied with the aid of a wide slit nozzle and an electrostatic discharge electrode to a non-woven mat of thermoplastic fibers and filaments on a bonding roller and the resulting composite is then subjected to biaxial stretching utilizing at least some of the bonding heat carried by the composite. The composite may then be thermally fixed before being cooled to room temperature.

17 Claims, 1 Drawing Sheet

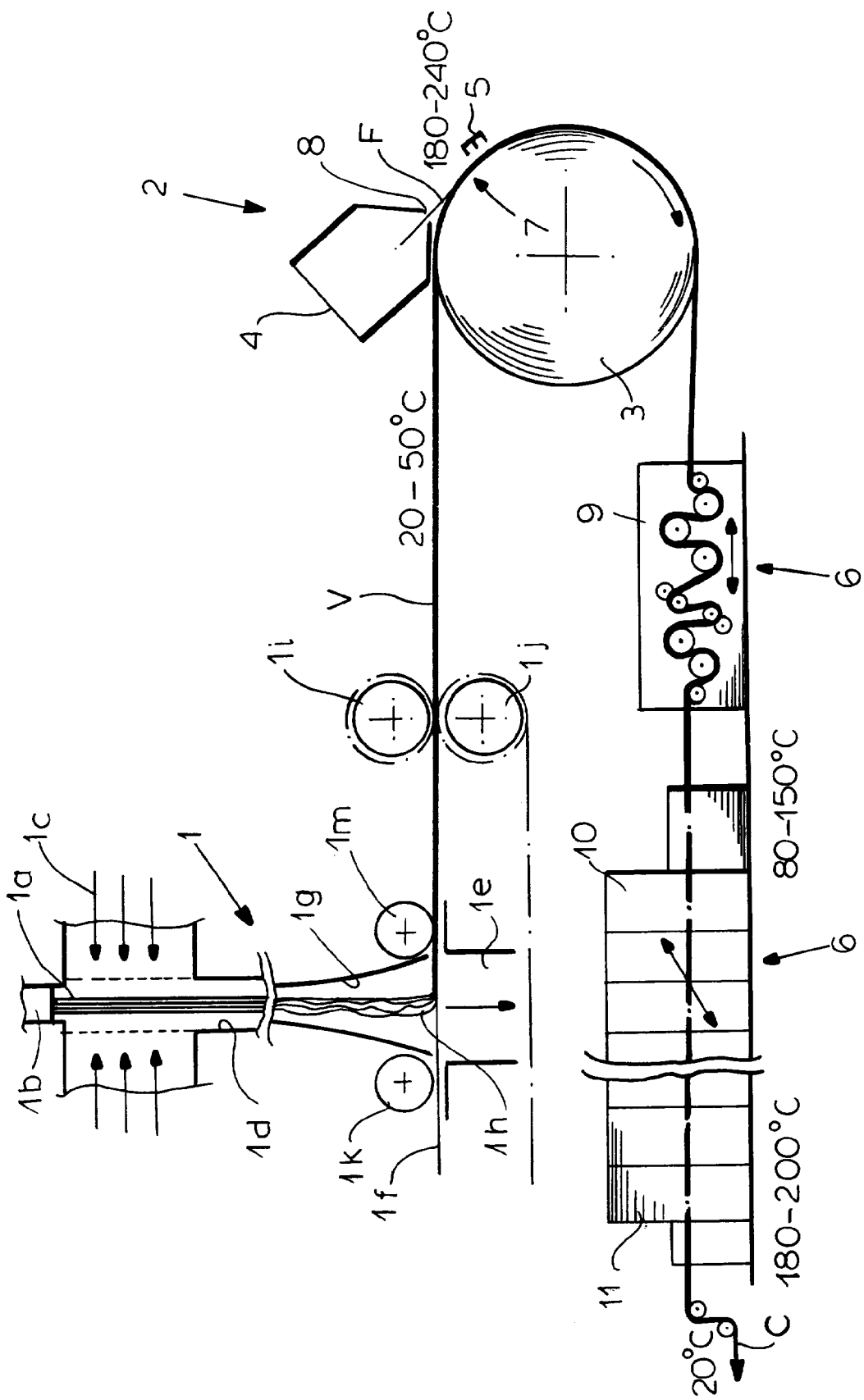

METHOD OF AND APPARATUS FOR PRODUCING A COMPOSITE WEB

FIELD OF THE INVENTION

Our present invention relates to a method of and to an apparatus for producing a composite web having a fleece or mat of thermoplastic synthetic resin filaments or fibers, i.e. a nonwoven mat, bonded to a synthetic resin foil.

BACKGROUND OF THE INVENTION

It is known to bond a nonwoven mat or fleece of thermoplastic synthetic resin filaments (e.g. spun bond) or fibers (e.g. melt blown) to a foil of synthetic resin material and even to apply the synthetic resin material as a melt to the mat or fleece from a wide-slit nozzle so that, upon congealing, the melt will form a foil.

It is also known, in the fabrication of synthetic resin webs to utilize biaxially stretched mats or webs, i.e. webs or mats which have been stretched both in the longitudinal and transverse direction to improve the mechanical properties of the mat or fleece.

In German Patent Document DE 195 34 702 A1), moreover, it is taught to use an electrostatic charge to create force fields which press the foil onto the nonwoven fleece web or mat.

While biaxial stretching has been carried out in the past, the nonwoven mat has been subject to such stretching before the mat reaches the bonding roller on which the foil is applied to the mat so that the plastic foil will remain unstretched.

Composite webs fabricated with such nonwoven mats or fleeces heretofore have generally been found to be satisfactory for many purposes. However it has been found that composite materials are desirable where the synthetic resin foil component must be especially thin to achieve a desired degree of gas permeability, for example when the web should be capable of "breathing." It has been found to be difficult to handle the extremely thin foils that are necessary for a high degree of gas permeability and to effectively bond such foils to the nonwoven mat or fleece because of the low heat capacity of the foils. When the mechanical properties of stretched foils were to be exploited, it was necessary to provide relatively thick foils and that interfered with the breathability of the composite.

OBJECTS OF THE INVENTION

It is the principal object of the present invention to provide an improved method of making a composite foil which solves problems hitherto encountered in the handling of very thin preformed foils and yet can yield a composite product which has a desired degree of breathability or gas permeability.

Another object of the invention is to provide a method of and an apparatus for making a composite foil whereby drawbacks of earlier systems are avoided.

It is a particular object of this invention to provide a method of making a composite web which will ensure that the foil component can be extremely thin but yet which eliminates any difficulties in handling or fabrication of the type which has been associated with thin webs and bonding problems with thin foils in the past.

SUMMARY OF THE INVENTION

These objects and others which will become apparent hereinafter are attained, in accordance with the invention, in a method or process in which a process of a thermoplastic web is fed by a wide slit nozzle onto a previously formed nonwoven mat or fleece of thermoplastic synthetic resin filaments or fibers (e.g. spun bond or melt blown fleeces or mats) on a bonding roller and electrostatic force is used to press the melt or foil against, onto and into the fleece or nonwoven mat. According to the invention, after the resulting web, made up of the nonwoven mat and the foil forming melt on one side thereof leaves the bonding roller and before it is cooled to room temperature and while that web retains at least some of its bonding heat, it is biaxially stretched in its longitudinal and its transverse directions.

The apparatus for carrying out the invention thus has the biaxial stretching unit or units located downstream of the bonding roller and upstream of any location at which the web may be cooled. More particularly, the method of the present invention may comprise the steps of:

(a) continuously producing a mat of thermoplastic synthetic resin filaments or fibers and feeding the mat around a bonding roller having a length at least equal to a width of the mat and a peripheral speed corresponding to a travel speed of the mat;

(b) feeding generally tangentially onto one side of the mat on the bonding roller from a wide-slit nozzle opening onto the mat where the mat runs onto the roller a hot melt of a thermoplastic synthetic resin in a virgin plastic state to coat the side of the mat with a foil formed upon cooling of the melt to form a coated web;

(c) electrostatically charging the melt as it is applied to the mat with at least one corona discharge electrode extending across the path of the coated web and juxtaposed therewith;

(d) after the coated web leaves the roller and while the mat and the melt are at an elevated temperature at least in part resulting from heat at which the melt is bonded to the mat, biaxially stretching the coated web in a direction parallel to the length of the coated web and in a direction parallel to the width of the coated web to produce a biaxially stretched web; and (e) then cooling the biaxially stretched web to substantially room temperature.

The apparatus can comprise:

a bonding roller;

means for feeding a mat of thermoplastic synthetic resin filaments or fibers onto the bonding roller, the bonding roller having a length at least equal to a width of the mat and a peripheral speed corresponding to a travel speed of the mat;

a wide-slit nozzle opening generally tangentially onto one side of the mat on the bonding roller for a hot melt of a thermoplastic synthetic resin in a virgin plastic state onto the mat to coat the side of the mat with a foil formed upon cooling of the melt to form a coated web;

at least one corona discharge electrode extending across the path of the coated web and juxtaposed therewith for electrostatically charging the melt as it is applied to the mat;

means for biaxially stretching the coated web in a direction parallel to the length of the coated web and in a direction parallel to the width of the coated web after the coated web leaves the roller and while the mat and the melt are at an elevated temperature at least in part resulting from heat at which the melt is bonded to the mat, to produce a biaxially stretched web; and means for cooling the biaxially stretched web to substantially room temperature.

The invention is based upon our discovery that the problems which have hitherto been encountered as a result especially of the very small thicknesses of the synthetic resin foil can be overcome elegantly in that the biaxial stretching is no longer carried out prior to bonding only on the nonwoven mat or fleece, but rather is practiced on the complete composite web after the bonding has been completed. The synthetic resin foil is thus reinforced by the fiber or filament fleece or mat so that the composite retains sufficient heat to facilitate biaxial stretching. The heat capacity of the foil is augmented by the heat capacity of the synthetic resin filaments or fibers of the nonwoven mat and the total heat capacity can then be applied to ensure that the composite will carry sufficient heat from the bonding roller to the biaxial stretching station. Of course, during the coating of the nonwoven mat or fleece with the melt, the heat of the melt is sufficient to effect fusion of the melt, which ultimately will form the foil, with the filaments or fibers of the nonwoven mat.

Extremely thin foil layers can thus be provided in bonded relationship to the nonwoven mat, for example foils with thicknesses significantly less then 20 $\mu$m, without difficulty and without the problems hitherto encountered in the handling of such thin foils.

Of course, if the distance between the biaxial stretching and the bonding roller is excessive, the composite may have to be heated following the bonding step and prior to the biaxial stretching.

We have found that, with the invention, composites which are of comparatively low weight per unit area and extremely thin synthetic resin foils can be fabricated which have relatively high strength and a high degree of gas permeability for the fabrication of articles which are capable of "breathing" and are highly useful in the hygiene field.

According to a feature of the invention, while a wide variety of synthetic resins can be used for the nonwoven mat or fleece and the synthetic resin foil, the preferred material for the nonwoven mat or fleece is a polypropylene homopolymer (PP homopolymer) while the synthetic resin foil is a PP homopolymer and/or a polypropylene copolymer (PP copolymer), especially a copolymer with polyethylene (PE).

The thermoplastic synthetic resin of the foil can contain additives such as polypropylene-elastomer blends, LLD-PE and/or fillers which can affect the foil structure.

Basically, between the production of the nonwoven mat or fleece and its coat with the synthetic resin foil, there can be a relatively long time interval. In other words the nonwoven fleece or mat can be prepared in advance and fed at room temperature to the coating stage. Of course the mat can also be produced immediately before being fed to the bonding roller and can retain at least some of the heat and supplied in the formation of the thermoplastic synthetic resin filaments or fibers.

In any case it is preferred to feed the nonwoven mat or fleece at a temperature of between 20° to 50° C. to the bonding roller. If the nonwoven mat is at a lower temperature it can be heated to a higher temperature which nevertheless is below its melting temperature, e.g. about 50° C. before it is applied to the bonding roller. The synthetic resin foil, emerging as a melt from the wide slit nozzle, can be applied to the nonwoven mat or fleece at a temperature of 180° to 240° C.

The biaxial stretching is carried out both in the longitudinal and in the transverse direction by 100% to 400% and at a temperature of preferably 80° to 150° C. The composite can be heated up to a temperature in this range if its temperature has dropped, following leaving the bonding roller, excessively.

It has been found to be advantageous to thermofix the composite web after the biaxial stretching, e.g. by heat treating and with hot air at a temperature of 180° to 200° C.

BRIEF DESCRIPTION OF THE DRAWING

The above and other objects, features, and advantages will become more readily apparent from the following description given with reference to the accompanying drawing in which the sole FIGURE is a diagrammatic side elevational view of an apparatus for producing a composite web according to the invention.

SPECIFIC DESCRIPTION

The drawing shows schematically an apparatus for producing a nonwoven web from which a composite web can be formed. The nonwoven mat or fleece V is composed of synthetic resin filaments and/or synthetic resin fibers of thermoplastic which can be coated with a synthetic resin foil fiber of thermoplastic synthetic resin in a continuous manner.

At the upstream end of the apparatus a unit 1 is provided for producing synthetic resin filaments, and generating the nonwoven mat and has been illustrated by way of example. This unit is a spun bond nonwoven mat apparatus. A melt blown apparatus can be used instead or the fleece or the mat can be produced by a combination of melt blown fibers or spun bond filaments.

In the apparatus shown, the thermoplastic resin is extruded in a curtain of strands 1a from a spinneret 1b and is cooled by process air 1c admitted into a drawing shaft 1d through which air is accelerated in part by suction applied at 1e below a perforated collecting belt 1f. At the lower end of the shaft 1d, a diffuser 1g is provided in which turbulence causes the jumbling of the filaments 1h before they collect on the belt. The resulting mat V may be pressed by a calender roller 1i juxtaposed with the downstream belt roller 1j. Upstream and downstream of the evacuated space 1e, rollers 1k and 1m may be provided to press against the belt 1f and the nonwoven mat V respectively.

At a temperature of 20° to 50° C., the nonwoven mat V meets the bonding roller 3. Where the nonwoven mat V meets the rollers 3, a wide-slit nozzle 4 discharges a thermoplastic melt to form the fleece F at the temperature of 180° to 240° C. The resulting foil meets the mat at 7 and in this region at least one corona discharge electrode 5 is provided to generate free electrons which adhere to the foil or at least so charge the foil that the foil is electrostatically pressed into and onto the nonwoven mat V. The bonding station has been represented as a hole at 2.

Downstream of the bonding station is a stretching station 6 for the biaxial stretching of the composite web C.

The bonding roller 3 rotates with a peripheral speed equal to the speed of the fleece V and has a length at least equal to the width thereof.

The synthetic resin foil F generated from the thermoplastic synthetic resin emerging from the slit mouth 8 in its virgin plastic state, is applied generally tangentially to the nonwoven mat V on the bonding roller 3 and with the aid of the electrostatic forces resulting from the charge applied by the electrode 5, is pressed onto the nonwoven mat. After the composite leaves the roller 3 and while it still retains at least part of the bonding heat, it is subjected to longitudinal and transverse stretching, i.e. biaxial stretching by the double headed arrows. The unit 9, for example, stretches the composite web longitudinally while the unit 10 stretches the composite web transversely in the plane of the web, i.e. in its width dimension, both by 100 to 400%.

After the biaxial stretching, the composite is thermofixed with hot air at a temperature of 180 to 200° C. before being cooled to room temperature at about 20° C.

The nonwoven mat V is composed of a polyproplyene homopolymer and the plastic foil is composed of polypropylene homopolymer or copolymer. Additives in the form of polypropylene-elastomer blends or linearly structured low density polyethylene (LLDPE) and/or fillers which can affect the foil structure can be introduced into the foil melt.

We claim:

1. A method of producing a composite web, comprising the steps of:
   (a) continuously producing a mat of thermoplastic synthetic resin filaments or fibers and feeding said mat around a bonding roller having a length at least equal to a width of said mat and a peripheral speed corresponding to a travel speed of the mat, said mat having opposite sides;
   (b) feeding generally tangentially onto one of said sides of said mat on said bonding roller from a wide-slit nozzle opening onto said mat where said mat runs onto said roller a melt of a thermoplastic synthetic resin in a plastic state to coat said one of said sides of said mat with a foil formed upon cooling of said melt to form a coated web;
   (c) electrostatically charging said melt as it is applied to said mat with at least one corona discharge electrode extending across the coated web and juxtaposed therewith;
   (d) after said coated web leaves said roller and while said mat and said melt are at a temperature at least in part resulting from heat at which said melt is bonded to said mat, biaxially stretching said coated web in a direction parallel to the length of the coated web and in a direction parallel to the width of the coated web to produce a biaxially stretched web; and
   (e) then cooling said biaxially stretched web to substantially room temperature.

2. The method defined in claim 1 wherein said mat is composed of polypropylene homopolymer and said melt is composed of a polypropylene homopolymer or a polypropylene copolymer.

3. The method defined in claim 2 wherein the thermoplastic synthetic resin of the melt contains additives selected from the group consisting of polypropylene-elastomer blends, LLDPE, fillers and mixtures thereof.

4. The method defined in claim 3, further comprising the step of preheating said mat before it is fed onto said roller to an elevated temperature below the melting temperature of the thermoplastic synthetic resin constituting said mat.

5. The method defined in claim 4 wherein said melt has a temperature, where said melt is fed onto said side of said mat, of 180° C. to 240° C.

6. The method defined in claim 5 wherein said coated web is stretched in step (d) in both the direction parallel to the length of the coated web and in the direction parallel to the width of the coated web by 100% to 400%.

7. The method defined in claim 6 wherein said coated web is biaxially stretched at a temperature of 80° C. to 150° C.

8. The method defined in claim 7, further comprising the step of thermally fixing the biaxially stretched web after the biaxial stretching thereof.

9. The method defined in claim 8, wherein the biaxially stretched web is thermally fixed in hot air at a temperature of 180° C. to 200° C.

10. The method defined in claim 1, further comprising the step of preheating said mat before it is fed onto said roller to an elevated temperature below the melting temperature of the thermoplastic synthetic resin constituting said mat.

11. The method defined in claim 1 wherein said melt has a temperature, where said melt is fed onto said side of said mat, of 180° C. to 240° C.

12. The method defined in claim 1 wherein said coated web is stretched in step (d) in both the direction parallel to the length of the coated web and in the direction parallel to the width of the coated web by 100% to 400%.

13. The method defined in claim 1 wherein said coated web is biaxially stretched at a temperature of 80° C. to 150° C.

14. The method,defined in claim 1, further comprising the step of thermally fixing the biaxially stretched web after the biaxial stretching thereof.

15. The method defined in claim 1 wherein the biaxially stretched web is thermally fixed in hot air at a temperature of 180° C. to 200° C.

16. An apparatus for making a composite web, comprising:
    a bonding roller;
    means for feeding a mat of thermoplastic synthetic resin filaments or fibers onto said bonding roller, said bonding roller having a length at least equal to a width of said mat and a peripheral speed corresponding to a travel speed of the mat, said mat having opposite sides;
    a wide-slit nozzle opening tangentially onto one of said sides of said mat on said bonding roller for a melt of a thermoplastic synthetic resin in a plastic state onto said mat to coat said one of said sides of said mat with a foil formed upon cooling of said melt to form a coated web;
    at least one corona discharge electrode extending across the path of the coated web and juxtaposed therewith for electrostatically charging said melt as it is applied to said mat;
    means for biaxially stretching said coated web in a direction parallel to the length of the coated web and in a direction parallel to the width of the coated web after said coated web leaves said roller and while said mat and said melt are at a temperature at least in part resulting from heat at which said melt is bonded to said mat, to produce a biaxially stretched web; and
    means for cooling said biaxially stretched web to substantially room temperature.

17. The apparatus defined in claim 16, further comprising means for thermally fixing the biaxially stretched web between said means for cooling and said means for biaxially stretching.

* * * * *